(12) United States Patent
Komotzki

(10) Patent No.: US 10,150,616 B2
(45) Date of Patent: Dec. 11, 2018

(54) SCRAPER FOR A SCRAPER CHAIN CONVEYOR

(71) Applicant: Komotzki Bergbaubedarf GMBH, Dortmund (DE)

(72) Inventor: Michael Komotzki, Kamen (DE)

(73) Assignee: Komotzki Bergbaubedarf GMBH (DE)

( * ) Notice: Subject to any disclaimer, the term of this patent is extended or adjusted under 35 U.S.C. 154(b) by 0 days.

(21) Appl. No.: 15/680,511

(22) Filed: Aug. 18, 2017

(65) Prior Publication Data

US 2017/0341869 A1    Nov. 30, 2017

Related U.S. Application Data

(63) Continuation of application No. PCT/EP2016/054113, filed on Feb. 26, 2016.

(30) Foreign Application Priority Data

Feb. 27, 2015 (DE) .......................... 10 2015 002 539
Feb. 19, 2016 (DE) .......................... 10 2016 001 996

(51) Int. Cl.
*B65G 19/24*    (2006.01)

(52) U.S. Cl.
CPC ...... *B65G 19/24* (2013.01); *B65G 2812/0296* (2013.01)

(58) Field of Classification Search
CPC ............................. B65G 19/24; B65G 19/245
USPC ................................................. 198/728, 731
See application file for complete search history.

(56) References Cited

U.S. PATENT DOCUMENTS

| 2,466,240 A * | 4/1949 | Joa | B65G 19/245 198/615 |
| 6,595,351 B2 * | 7/2003 | Malitzki | B65G 19/24 198/728 |
| 2015/0144464 A1 * | 5/2015 | Klingbeil | B65G 19/24 198/731 |

FOREIGN PATENT DOCUMENTS

| DE | 2905756 | 8/1980 |
| DE | 3016151 | 11/1981 |
| DE | 3907639 | 9/1990 |
| DE | 3915785 | 11/1990 |
| DE | 4324227 | 1/1995 |

\* cited by examiner

*Primary Examiner* — James R Bidwell
(74) *Attorney, Agent, or Firm* — Jeffrey Joyce; Patricia Mathers

(57) ABSTRACT

A scraper for use on a scraper chain conveyor, the scraper having an upper element and a lower element. A chain bed for receiving at least one horizontal chain link and at least one vertical chain link is formed in both upper and lower elements. The upper element and lower element are connected together by means of form-fit surfaces provided on the upper element and the lower element, such that these form-fit surfaces engage with each other when the two elements are assembled for operation to form a form-fit lock. A chain link presses from behind against the lower element or the upper element of the scraper in the direction of transport and this force reinforces the form-fit lock between the two elements.

4 Claims, 5 Drawing Sheets

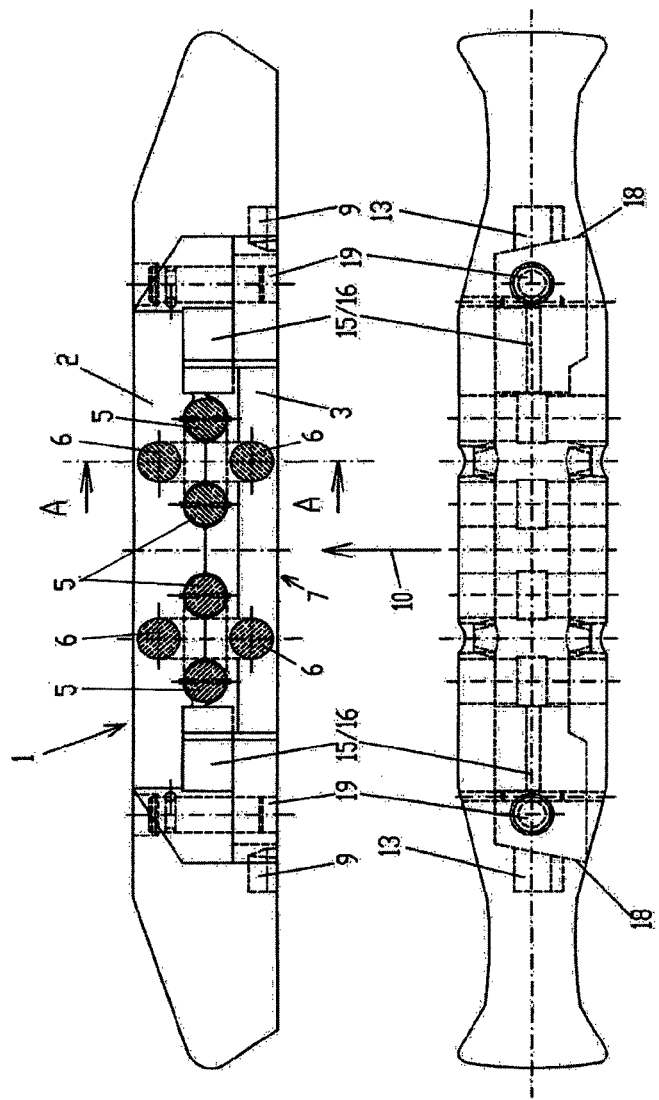

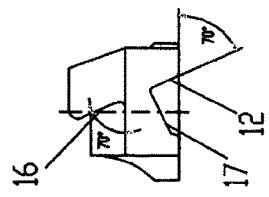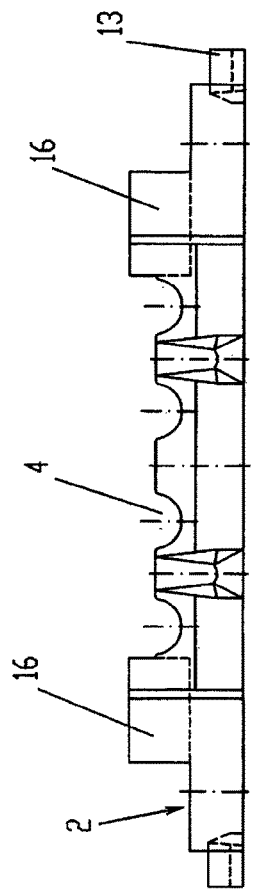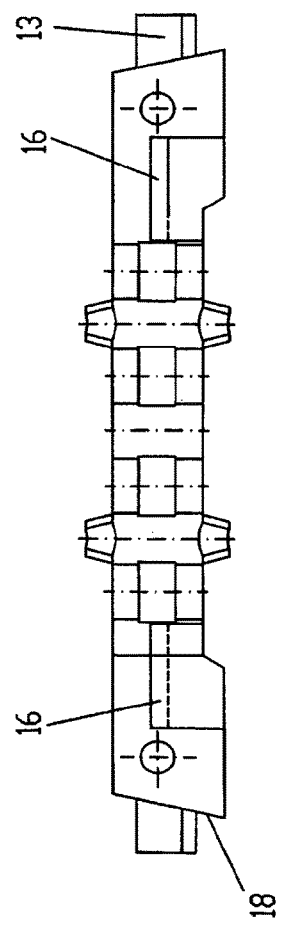

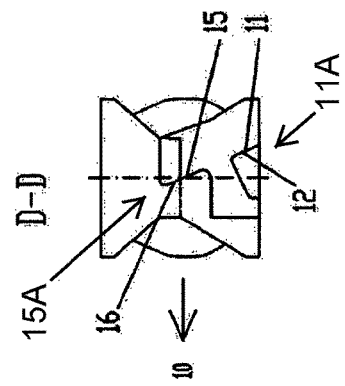
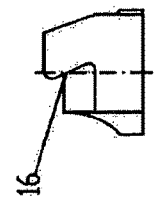
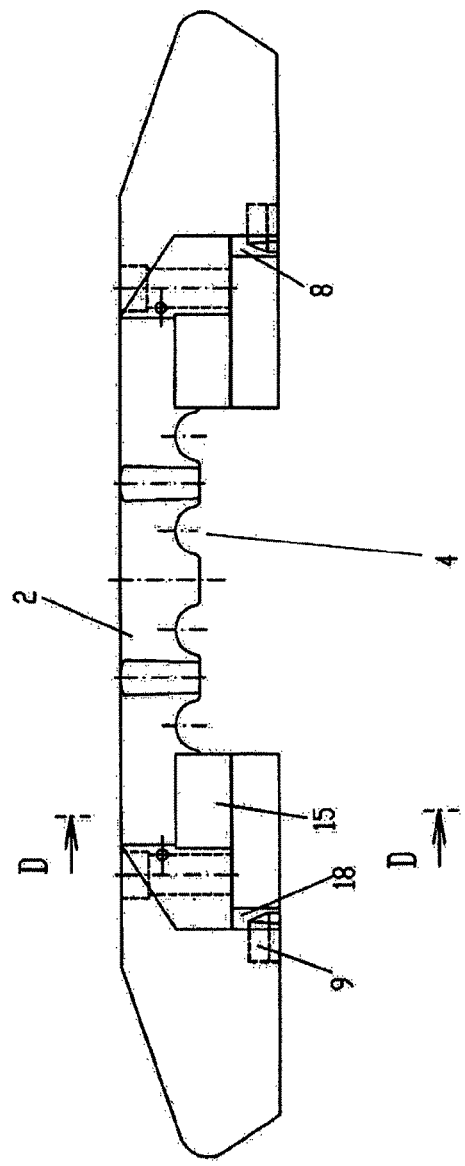
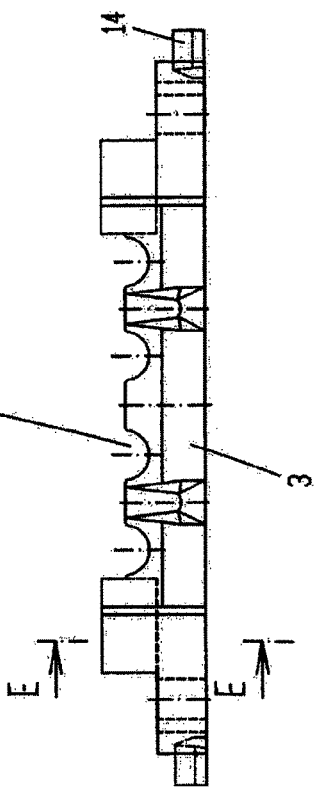

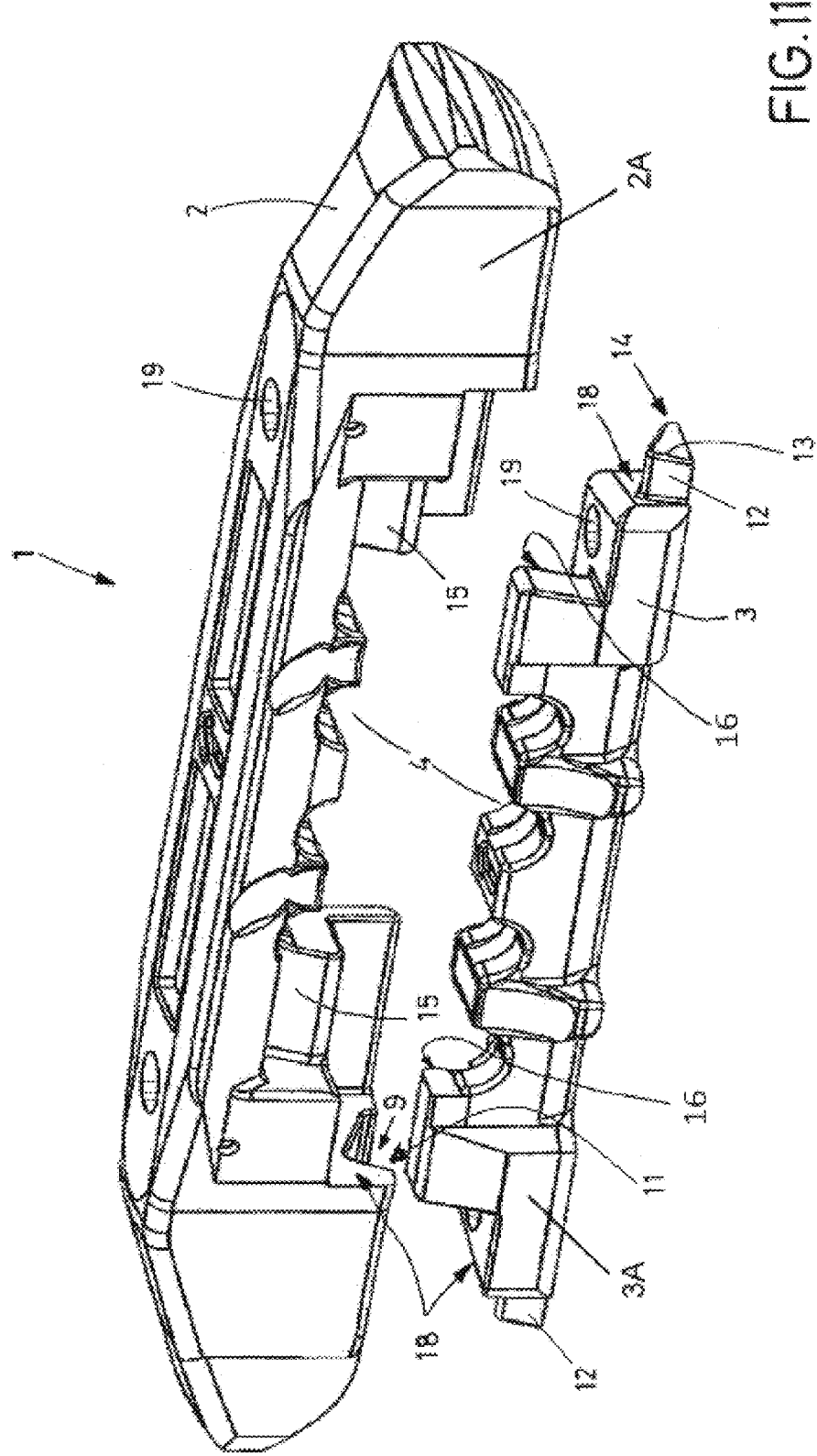

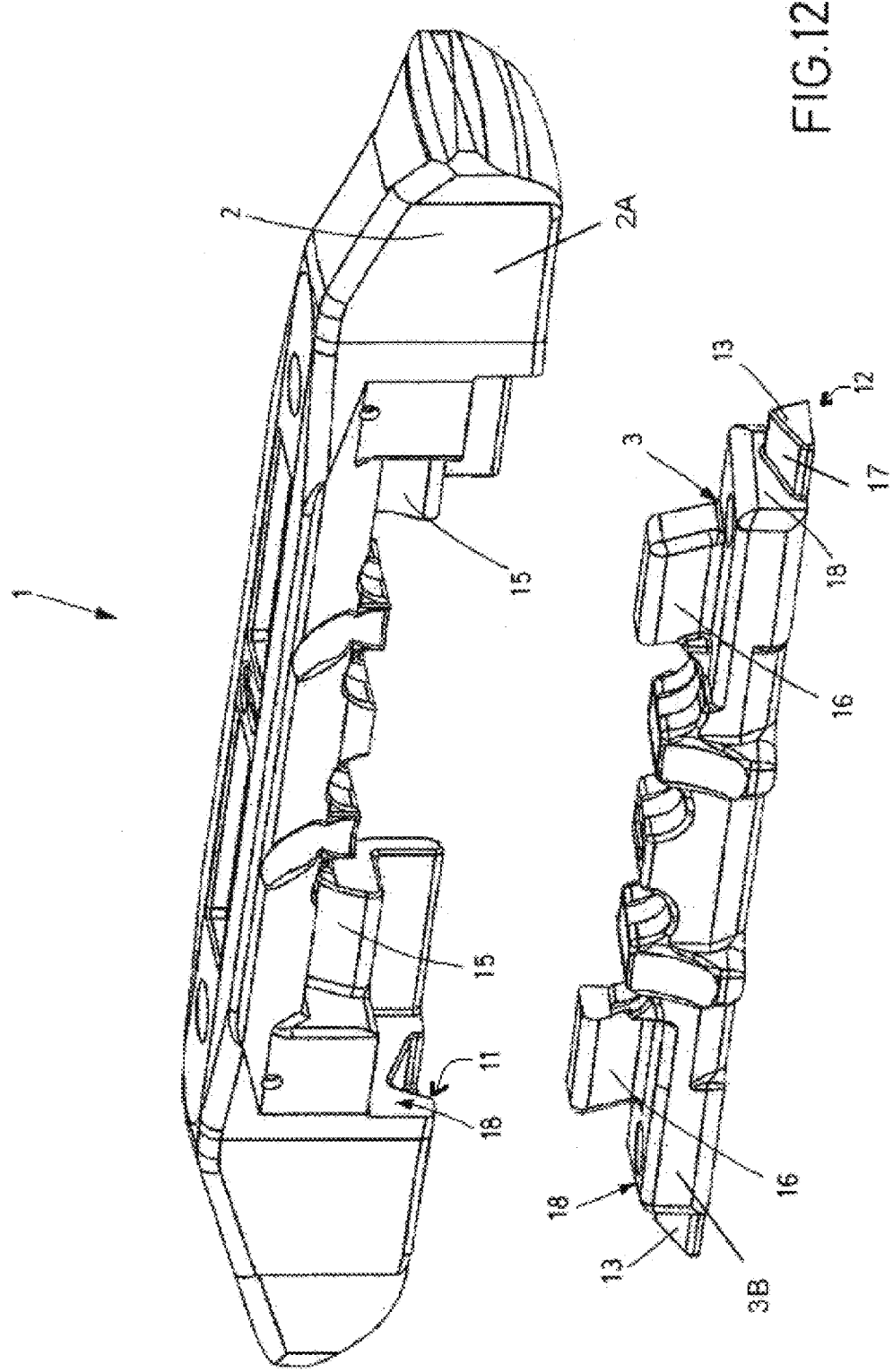

SCRAPER FOR A SCRAPER CHAIN CONVEYOR

BACKGROUND INFORMATION

Field of the Invention

The invention relates to a scraper for a scraper chain conveyor.

Discussion of the Prior Art

Scraper chain conveyors are used primarily in underground mining and are subject to very high wear.

The scrapers are used with various types of chain conveyor systems, such as, for example, single chain or double chain conveyors and have a lower element and an upper element that are connected to each other. Many different types of connections are used to connect the two scraper elements, but none of the known connections is completely satisfactory. A threaded connection, i.e., a vertical threaded connection, has proven to be unreliable. This is because the vertical chain link that presses against the scraper has a round contour and the resulting thrust forces have force components that tend to force the upper and lower elements of the scraper apart. This exerts undesirable tension forces on the threaded connection and are further reinforced by forces resulting from transportation across uneven terrain that includes peaks and troughs, and also by the return run of the conveyor chain.

Nevertheless, a vertical threaded connection between the upper and lower elements of the scraper is the commonly used connection, even though it has repeatedly been seen that such a threaded connection is prone to loosening. This connection has been improved by securing the screw head in the lower element against rotation and by using various fastening means to secure the nut in the upper element. A construction according to DE 20 2013 007 439 U1 proved to be a successful method of securing the nut.

Thread-less connections have also been used for scrapers on scraper chain conveyors. German publications DE 32 17 577 A1, DE 37 05 914 C2, DE 101 47 846 A1, and DE 102 25 341 C1 disclose such connections. In the end, though, the scrapers therein were not able to establish themselves in the underground mining industry.

It is also known to stabilize the vertical threaded connection between the two scraper elements by the use of a form-fit locking cog on the lower element that engages in a slit on the upper element, as is described in DE 203 00 239 U1. This method does allow for guided vertical movement, but does not allow sliding movement in the vertical direction and in the direction of transport. Moreover, the additional fastening means cannot be eliminated. This method, however is considered the state of the art for the invention in this patent application.

What is needed, therefore, is a means of connecting upper and lower elements of a scraper for a scraper chain conveyor that is reliable and able to withstand the various forces exerted on the connection during operation of the conveyor. What is further needed is such a connection that is economical.

BRIEF SUMMARY OF THE INVENTION

The object of the invention is to provide a scraper for a scraper chain conveyor wherein a scraper lower element and a scraper upper element are connected to each other reliably and that does not require additional fastening means to maintain a reliable connection during operation of the conveyor. The upper and lower elements are coupled together by form-fit locks created by positive lock surfaces or form-fit contours that engage with each other to provide a firm coupling of the two elements. The upper element and lower element have mating positive lock surfaces that are curved or have an incline and that extend partially in the vertical direction and partially in the direction of transport of the conveyor. Furthermore, the forces that occur during scraper chain conveyor operation reinforce the lock fit between the upper and lower elements. Thus, the connection between the two elements is reliable, despite the rough operation conditions in which this type of conveyor typically operates.

Two types of form-fit locks are provided, referred to hereinafter first form-fit locks and second form-fit locks. The first form-fit locks operate together to provide a thread-less connection in the direction of transport travel, and the second form-fit locks serve to maintain a connection between the upper and lower elements during return travel, i.e., travel without transporting material. The shape of the positive lock surfaces that form the locks is such that the forces that are exerted on the scraper during operation reinforce the engagement between the upper element and the lower element as follows.

The material to be transported presents a certain resistance to transportation. As the conveyor chain moves in the transport direction, i.e., forward-travel direction, this resistance initially prevents the scraper from moving forward. A chain link moving forward in the forward-travel direction presses against the scraper and moves the scraper forward. In other words, the scraper is entrained by the chain and travels together with the chain once it has overcome the resistance presented by the material.

It is possible to provide entraining devices, often referred to as dogs, on the chain, so that the chain link exerts pressure indirectly via the dog on the scraper. But having the chain link come into direct contact with the scraper and thus exert pressure directly on the scraper is a particularly simple, economically advantageous connection that is robust enough to reliably work against the mechanical loading. Depending on the embodiment of the scraper and the shape of the form-fit or positive lock surfaces that form the first form-fit locks, a horizontal link or a vertical link of the chain may serve as the entraining device for the scraper and exert the corresponding pressure in the direction of travel on the scraper.

Constructively different embodiments with regard to placement and magnitude of the form-fit surfaces are possible, depending on whether the chain runs in the center or laterally in the edge area of the scraper.

If, for example, the chain link that serves as an entraining device acts on the lower element of the scraper, the first form-fit lock may be formed by mating form-fit surfaces of the upper element and the lower element that extend upwardly, i.e., from bottom to top, and in the direction of transport, whereby the cross-section of the lower element forms a hook-like section that grasps a receiving protrusion on the upper element. In this way, the lower element acts as an entraining device for the upper element. The back-pressure acting on the the upper element does not lift the upper element, but rather, the positive lock surfaces of the two elements guide the upper element diagonally downward and in the direction of the lower element, thereby reinforcing the engagement of the first form-fit lock between upper element and lower element.

If, however, the situation is reversed and the chain link that serves as the entraining device acts on the upper element, the geometric relationships of the upper element and the lower element are simply constructed opposite to that described above. The effect is the same, namely, that the increasing pressure the entraining chain link exerts on the scraper reinforces the lock between the upper element and the lower element. Locking the upper element and the lower element in this way works against a separation in the vertical direction between the two scraper elements.

The described first form-fit lock between the upper and lower scraper elements, which is practically self-reinforcing when under load due to the resistance that the material to be transported exerts, provides a reliable coupling of the two elements during the conveying motion of the scraper chain conveyor, because it guarantees a sufficiently strong contact pressure of the entraining chain link on the scraper.

The transport material does not exert a load on the scraper during the return run of the scraper chain conveyor. Also, the conveyor chain and the scraper are exposed to vibrations and thrusts, due to the rough operating conditions, that act in the running direction of the conveyor chain, as well as in the vertical direction. Thus, it may be advantageous to provide an additional connector element between the upper element and the lower element, to prevent a separation of the two elements when the conveyor travels in the return direction. A bolt that extends through bores in the upper and lower elements, the bores being aligned with each other, is a simple and inexpensive additional connecter. The geometry of the form-fit surfaces prevents a separation of the two scraper elements in the vertical direction and, because of this, the bolt does not have to withstand any holding forces in the vertical direction to hold the upper element and the lower element together. Rather, the purpose of the bolt is only to prevent a shifting of these two scraper elements in the direction of travel.

Conventional methods may be implemented to secure the position of the additional connector element—for example, the aforementioned bolt. The bolt may be provided as a threaded embodiment which is threaded directly onto the upper element or the lower element of the scraper. Additional security elements may also be used, such as, for example, a ratchet mechanism, a bayonet latch, or a worm screw that meshes radially with the bolt.

BRIEF DESCRIPTION OF THE DRAWINGS

The present invention is described with reference to the accompanying drawings. In the drawings, like reference numbers indicate identical or functionally similar elements.

FIG. 1 is a side plan view of a scraper on a double strand scraper chain conveyor, shown in the longitudinal direction of the conveyor chain.

FIG. 2 is a top plan view of the scraper of FIG. 1.

FIG. 3 is a cross-sectional view through the scraper along the line A-A in FIG. 1.

FIG. 4 is a side plan view of the lower element of the scraper.

FIG. 5 is a top plan view of the lower element of FIG. 4.

FIG. 6 is a side plan view of the lower element of FIG. 4, illustrating the glide surface and the positive lock surface on the lower element.

FIG. 7 is a side plan view of the upper element of FIG. 1.

FIG. 8 is side plan view of the lower element of the scraper of FIG. 1, placed in proper alignment for assembly with the upper element.

FIG. 9 is plan view of a cut along the line D-D in FIG. 7.

FIG. 10 is a plan view of a cut along the line E-E in FIG. 8.

FIG. 11 is an exploded perspective view of the upper element and the lower element, whereby the two elements are in proper alignment for assembly.

FIG. 12 is an exploded perspective view of the upper element and the lower element, similar to FIG. 11, but with the lower element rotated 180 degrees from its assembly position.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIG. 1 illustrates a scraper 1 according to the invention comprising an upper scraper element 2 and a lower scraper element 3, fully assembled on a conveyor chain 7 of a scraper chain conveyor. In this embodiment, the conveyor chain 7 is a double strand chain having horizontal links 5 and vertical links 6. A recognizable bolt connection 19 between an upper element 2 and a lower element 3 is not relevant to the inventive features of the scraper 1 and serves only to hold the upper and lower elements 2 and 3 together during the return run of the conveyor.

FIGS. 11, 12, and 9 illustrate first and second lower form-fit lock surfaces 11 and 12, respectively, and first and second upper form-fit surfaces 15 and 16, respectively. The upper form-fit surfaces 15 and 16 cooperate together to form an upper form-fit lock 15A and the lower form-fit surfaces 11 and 12 cooperate together to form a lower form-fit lock 11A. These locks 15A and 11A are used to reliably hold the scraper elements 2 and 3 together during operation.

It is noted that the terms "upper" and "lower" in reference to these form-fit locks does not correlate to the upper and lower elements 2, 3 of the scraper, but rather, indicate only a spatial relationship between the two locks 15A and 11A on the assembled scraper 1. As can be seen in these figures, the first lower form-fit surface 11 is provided on the upper element 2 and the second lower form-fit surface 12 is provided on the lower element 3. Similarly, the first upper form-fit surface 15 is provided on the upper element 2 and the second upper form-fit surface 16 is provided on the lower element 3.

FIG. 11 shows respective front faces 2A and 3A of the upper and lower elements 2 and 3. These elements are aligned for assembly together and facing forward, i.e., facing in the direction of travel 10, i.e., the direction material is transported. FIGS. 2, 3, and 9 illustrate the direction of travel 10. FIG. 12, on the other hand, shows the upper element 2 facing forward, but the lower element 3 rotated 180 degrees, so as to illustrate a rear face 3B and the form-fit surfaces 12 and 16.

As can be seen in FIGS. 9 and 11, the upper form-fit surface 15 is an inclined surface on the upper element 2, with the incline projecting downward and backward in the travel direction 10. The mating second upper form-fit surface 16 is provided on the front face 2B of the lower element 3 and has an inclined surface that projects upward in the travel direction, i.e., in the direction of travel 10.

FIGS. 9 and 10 are cross-sectional figures that illustrate how these form-fit surfaces 11, 12, 15, and 16 engage to form form-fit locks 11A and 15A to provide a reliable coupling of the upper and lower elements 2, 3. FIGS. 11 and 12 show that the first lower form-fit surface 11 is a V-shaped contour provided on a lower edge of the upper element 2. An extension 13 is provided on both ends of the lower element 3 and the second lower form-fit surface 12 is formed on this extension.

To bring the form-fit surfaces 11 and 15 in contact with the form-fit surfaces 12 and 16, the lower element 3 is placed beneath the conveyor chain 7 and the upper element 2 moved in the direction of transport travel 10 until the form-fit surfaces of the upper element 2 and the lower element 3 are in contact with each other. The upper element 2 and lower element 3 are now in a loose connection to each other. During operation, the entraining vertical chain link 6 presses the scraper 1 up against the material to be transported. This material presents a resistance to motion that acts primarily on the larger upper element 2. The force from the upright vertical link 6 forces the lower element 3 against the upper element 2, which is braked by the resistance to travel. The upper element 2 and the lower element 3 are moved against each other in this way, thereby forcing the upper form-fit surfaces 15 and 16 closer together, i.e., the locks 11A and 15A are formed when the upper element 2 and the lower element 3 are in this operational position.

The upper positive lock surfaces 15 and 16 are placed at the level of and up against the horizontal chain links 5, so that the forces from the chain acting on the scraper 1 are absorbed centrally by the upper positive lock surfaces 15 and 16, without causing disruptive torques or torques that could cause deformation in the chain conveyor. This operative position is maintained even under transport resistance. In this phase, a relief edge 18 described below is also in the operative position.

Security elements, such as, for example, security bolts, clamping sleeves, or clamping pins, may be provided in the vertical openings 19 to secure the position of the upper element 2 and the lower element 3 of the scraper 1 in the assembled position. Due to the incline geometry of the upper positive lock surfaces 15 and 16, which is about 70 degrees in the embodiment shown, the upper element 2 can separate from the lower element 3 during operation only if the security elements function as shear bolts. Thus, it is not necessary to apply a tension load to the security elements, thereby achieving a significantly longer service life of the conveyor.

FIGS. 4, 8, 11, and 12 show the lower element 3 having an extension 13 in two outer end areas 14 and a chain bed 4 for receiving the chain 7. When assembling the upper element 2 and the lower element 3, the extension 13 projects into a recess 9 on the upper element 2 via a slide surface 17. These recesses 9 are provided in the inner conveyor floor areas 8, (see FIG. 7) of the upper element 2. When assembled, the lower element 3 and the upper element 2 are fixedly connected to each other and the upper and lower positive lock surfaces 11, 12, and 15, 16 are in contact against each other, as shown in FIG. 9.

The scraper 1 is pushed from the front, against its operational design, during return travel or correction travel of the chain conveyor, whereby forces may occur that tend to separate the upper element 2 and the lower element 3. This separation is prevented by the security elements, shown in FIGS. 1 and 2. The lower element 3 may tilt away from the upper element 2 during return travel, but the lower form-fit lock 11A with its positive lock surfaces 11 and 12 serves as a block or stop and limits the possible tilt motion.

FIGS. 2, 5, 11, and 12 also illustrate a insertion edge or relief edge 18 that is provided at the two end areas of the lower element 3. The relief edges 18 are tapered in the direction of travel 10 and mating surfaces are provided on the upper element 2 that form a cone-like contour. These relief edges 18 serve to center and stabilize the position of the lower element 3 in the upper element 2 in its assembled position.

Due to the engagements of the various positive lock surfaces 11 and 12, 15, and 16, the recesses 9 and extensions 13, and the relief edges 18, the scraper 1 according to the invention has an optimal and reliable connection between the upper element 2 and the lower element 3.

It is understood that the embodiments described herein are merely illustrative of the present invention. Variations in the construction of the scraper may be contemplated by one skilled in the art without limiting the intended scope of the invention herein disclosed and as defined by the following claims.

What is claimed is:

1. A scraper for a scraper chain conveyor having a conveyor chain having a plurality of chain links that include vertical chain links and horizontal chain links, the scraper comprising:
  an upper scraper element and a lower scraper element;
  a chain bed formed in the upper scraper element and in the lower scraper element, the chain bed formed to receive at least one horizontal chain link and at least one vertical chain link of the conveyor chain;
  one or more upper form-fit locks, each upper form-fit lock including a first upper form-fit lock surface provided on the upper scraper element and a second upper form-fit lock surface provided on the lower element; and
  one or more lower form-fit locks, each lower form-fit lock including a first lower form-fit lock surface provided on the upper scraper element and a second lower form-fit lock surface provided on the lower element;
  wherein the first upper form-fit lock surface has an inclined projection that extends in a first direction along a longitudinal run of the conveyor chain and the second upper form-fit lock surface has an projection that extends in a second direction that is opposite the first direction, such that, the first and second upper form-fit lock surfaces mate with each other to form the upper form-fit lock between the upper scraper element and the lower scraper element;
  wherein the chain bed is provided centrally on the upper scraper element and the horizontal links of the chain lie on a horizontal-link plane;
  wherein the first upper form-fit lock surfaces are arranged on the upper scraper element next to outer areas of the chain bed, along the horizontal-link plane, inclined vertically approximately 70 degrees in a direction of transport;
  wherein the second upper form-fit lock surfaces are arranged on the lower scraper element, inclined vertically and aligned so as to engage with the first upper form-fit lock surfaces to form the upper form-fit lock when the scraper is in its transporting position;
  wherein the upper scraper element has two ends with an inner floor area at each end, the inner floor area having a recess that is formed as a first lower form-fit lock surface;
  wherein the lower scraper element has two ends with an extension on each end, the extension formed as a second lower form-fit lock surface that engages with the first lower form-fit lock surface to form the lower form-fit lock when the upper scraper element and the lower scraper element are assembled in the operational position; and wherein, when one of the chain links of the conveyor chain exerts a force on the scraper in a direction of transport travel of the conveyor, the force reinforces the upper form-fit lock.

2. The scraper of claim 1, wherein an insertion slant is provided in the upper scraper element in the area of each recess, flaring in the direction of transport; and wherein the lower scraper element has a corresponding insertion slant, such that the lower scraper element becomes centered in the upper scraper element in a cone-like manner.

3. The scraper of claim 1, wherein a slide surface is provided on the extension, and wherein this slide surface tapers off ramp-like in the direction of transport.

4. The scraper of claim 1, vertical openings are provided in the upper scraper element and in the lower scraper element, in an area that does not interfere with the form-fit locks, vertical to the direction of transport, the vertical openings constructed to receive a security fastener that serve to secure the position of the scraper in the chain system, for example, during return travel of the chain.

* * * * *